United States Patent [19]

Stiff

[11] 4,286,476

[45] Sep. 1, 1981

[54] ROTARY SHAFT CONTROL APPARATUS

[76] Inventor: Bernard Stiff, 1350 Main St., Lynnfield, Mass. 01940

[21] Appl. No.: 965,236

[22] Filed: Dec. 1, 1978

[51] Int. Cl.$^3$ ............... F16H 33/04; F16H 15/26; F16H 35/08

[52] U.S. Cl. ..................... 74/640; 74/198; 74/395

[58] Field of Search ............. 74/640, 777, 675, 665 P, 74/571 L, 395, 397, 198; 192/4 R; 101/248, 220; 226/188; 415/122 A

[56] References Cited

U.S. PATENT DOCUMENTS

| | | | |
|---|---|---|---|
| 2,098,112 | 11/1937 | Shields | 74/395 |
| 2,110,272 | 3/1938 | Mayer | 74/395 |
| 2,309,646 | 2/1943 | Jacobson | 74/395 |
| 2,385,918 | 10/1945 | Heberlein | 74/395 |
| 2,677,971 | 5/1954 | Greenwood | 74/395 |
| 2,911,760 | 11/1959 | Barradell-Smith | 74/675 X |
| 2,920,503 | 1/1960 | Burrows | 74/675 |
| 2,986,952 | 6/1961 | Ward | 74/675 X |
| 3,159,039 | 12/1964 | Stiff | 74/640 X |
| 3,178,963 | 4/1965 | Musser | 74/640 |
| 3,196,713 | 7/1965 | Robinson | 74/640 |
| 3,487,722 | 1/1970 | Cline | 74/640 X |
| 3,550,475 | 12/1970 | Konstantinov et al. | 74/640 |
| 3,565,006 | 2/1971 | Stewart | 74/640 X |
| 3,724,368 | 4/1973 | Treff | 101/248 |
| 3,750,568 | 8/1973 | Weisgerber | 74/395 X |
| 4,006,685 | 2/1977 | Mosemiller | 74/395 X |
| 4,011,765 | 3/1977 | Tippmann | 74/198 X |

FOREIGN PATENT DOCUMENTS

810563 3/1959 United Kingdom ..................... 101/248

*Primary Examiner*—Alan D. Herrmann
*Attorney, Agent, or Firm*—Cesari and McKenna

[57] ABSTRACT

Apparatus for controlling a rotary shaft relative to a reference includes a strain wave drive having a specially shaped deformable ring gear for minimum stress. The wave generator part of the drive is normally caused to rotate with the input and output shafts connected to the drive's ring gears so that the two shafts are effectively keyed together. A tractive-type clutch assembly permits the wave generator to be rotated in one direction or the other relative to the deformable gear shaft so that the phase angle of the two shafts can be adjusted at a slow rate of speed dependent on the gear ratio of the drive. Also a tractive-type planetary assembly may be coupled between the clutch assembly and the wave generator so that the phase change may be accomplished at a plurality of speeds.

19 Claims, 10 Drawing Figures

ROTARY SHAFT CONTROL APPARATUS

This invention relates to apparatus for controlling the speed or phase angle of a rotary shaft relative to a reference. It relates more particularly to apparatus for maintaining especially close control over the speed or phase angle relationship between two concentric elements.

BACKGROUND OF THE INVENTION

Many manufacturing processes involve the close coordination of a series of steps that are synchronized cyclically in automatic machinery. The power and motion required for the operation is usually introduced into the machine by means of sprockets or gears affixed to certain shafts by means of shaft keys, and in a like manner the energy and appropriate motions are carried throughout the machine by other shafts and other keyed sprockets (gears) to perform the specific steps required. Due to various material behaviors and eccentricities characteristic of machinery, the desired timing relationships between shafts is not always forthcoming. Means must be available to adjust these various shafting timing relationships dynamically while the machine is operating.

Since sprockets and gears are keyed to their shafts, no dynamic adjustment is normally possible between a sprocket and its own shaft and any correction necessary must be performed by an external mechanism acting between any two shafts that are required to be timed, rather than between a particular sprocket and its own shaft. Power then, is transmitted through such an external mechanism from one machine shaft to another, but in so doing, a change in phase angle is caused to exist between those two machine shafts. Usually this external phase changing mechanism is a controllable differential that can advance or retard the phase relationship. Depending on the design this control can be manual or remote, or both. In most designs the motion passing through is continuous, with internal gears rotating constantly with respect to one another.

Such an external phasing mechanism is wall or floor mounted, having an input and output shaft. Power from the first machinery shaft is transmitted by a chain to the input of the differential and thence by another chain from the differential output to the machinery shaft number two. A multiplicity of shafts require almost a jungle of chains that flow to and from a multiplicity of wall or floor mounted differentials. In addition, each differential requires its own actuating motor or power source to change the phase angle.

For example, many web tension control systems use draw rollers driven by a controllable differential which controls the tension in a web conducted to a web-consuming machine such as a press. The differential is controlled by the output of a tension sensing device such as a movable dancer roller around which the web is trained, with the excursions of the dancer from a fixed reference position being detected by limit switches or the like.

Another application in which the precise timing control of a shaft is essential is the coordination of two or more conveyors. For example, in a given production line it may be necessary to transfer a succession of articles advancing on a horizontal conveyor onto a succession of vertically advancing shelves on a vertical conveyor. Here again, the speeds of the two conveyors may be synchronized by driving one of the conveyors from the main drive by way of a controllable differential. The differential is set to advance or retard the one conveyor relative to the other as needed to assure that the vertical conveyor is in the correct timing position to receive each article leaving the horizontal conveyor.

The maintenance of accurate control over a rotary shaft relative to its driver is especially important in a printing press wherein web is advanced past one or more printing cylinders which print the printed matter in one or more colors. Not only must the motions of the printing cylinders be controlled precisely relative to the advancing web to position the printed matter at the proper location on the web, but also the motions of the cylinders must be synchronized with each other so that the print from each cylinder is in exact registration on the web.

Finally, when controlledly driving shafts or rollers from a main drive shaft, it may be desirable to adjust the phase angle of the roller relative to the main shaft in a forward or reverse direction for purposes of registration or synchronization. During normal operation, it is desirable that the phase change take place quite slowly to avoid overshoot and for optimum accuracy. On the other hand, during initial set-up at the start of a run when the draw rolls are completely out of phase with the drive shaft or in times of emergency, it is desirable that the phase correction take place more quickly to save time and to avoid wastage. All other shaft control apparatus of this general type require external power sources in order to accomplish this and so have the same disadvantages described above.

A more convenient and satisfactory solution to the aforementioned control problems is the provision of a mechanism that mounts on a shaft, acting as an adjustable key, capable of changing the rotational position of a sprocket relative to its own shaft, dynamically and in either direction, drawing the power required for this function from the motion of the sprocket or its shaft without an ancillary power source.

Such a mechanism, then, would be useful in any field requiring machine timing. Such fields, to mention a few, include printing, packaging, collating, machinery timing, boxing, synchronizing, automatic assembly, tension control, and phase shifting.

SUMMARY OF THE INVENTION

Accordingly the present invention aims to provide improved apparatus for controlling the angular or phase relationship between a rotary shaft and another element.

Another object of the invention is to provide improved shaft timing and registering apparatus.

Another object is to provide such shaft control apparatus which can have exceptionally fine control capabilities.

A further object is to provide such apparatus whose reduction ratio can be changed easily by a simple interchanging of a part or parts.

A further object of the invention is to provide apparatus of this type which permits the speed and/or phase adjustment of a rotary shaft while the shaft is running.

Yet another object of the invention is to provide apparatus of this general type which is completely mechanical, requiring no additional power source to effect the shaft speed or phase change.

Another object is to provide apparatus for advancing and retarding a harmonic strain wave drive generator dynamically relative to its shaft.

Still another object of the invention is to provide a compact, shaft-hung apparatus which functions as a variable shaft key to adjust the phase angle of a shaft and its driving sprocket.

Another object is to provide such apparatus having essentially zero backlash.

A further object of the invention is to provide apparatus of this type which can effect shaft speed or phase angle changes at a plurality of different speeds.

Another object of the invention is to provide apparatus of this type whose internal parts for the most part move relative to one another only when a speed or phase change is actually being effected.

Yet another object of the invention is to provide rotary shaft control apparatus which provides exceptionally high torque coupling (i.e. 300 inch pounds) between its input and output shafts.

A further object of the invention is to provide rotary shaft control apparatus which is relatively easy and inexpensive to manufacture and assemble and is therefore relatively inexpensive.

Another object is to provide an improved strain wave drive for use in apparatus of this general type.

A further object is to provide a drive of this type whose deformable gear suffers a minimum amount of stress in operation.

Still another object is to provide an improved drive of this type which requires a minimum of axial load in order to operate.

A further object is to provide an improved strain wave drive which is relatively easy and inexpensive to manufacture.

Another object is to provide an improved clutch or brake assembly for use particularly in a shaft control apparatus to effect shaft motion in both directions, especially as applied to the wave generator in strain wave designs.

Yet another object is to provide an improved planetary assembly for use particularly in a shaft control apparatus to obtain especially high gear reductions, especially as applied to control the wave generator of strain wave drives.

Other objects will, in part, be obvious and will, in part, appear hereinafter.

The invention accordingly comprises the features of construction, combination of elements and arrangement of parts which will be exemplified in the following detailed description, and the scope of the invention will be indicated in the claims.

In general, my shaft control apparatus can be used in almost any application involving control of the speed or phase angle of a rotary shaft relative to a speed or phase reference. The reference may be a second driven shaft or an event in time or position. The present invention has particular application as a variable shaft key for varying the phase relationship between a sprocket and its shaft. Accordingly, the invention will be described in that context. It should be understood, however, that it has equal functionality in regulating, synchronizing, metering and other similar applications involving the maintenance of control of a rotary shaft relative to a reference.

The control apparatus includes an inner shaft and a concentric tubular outer shaft. The inner shaft is usually arranged to be supported by, and fixed for rotation with, the shaft being controlled, while a sprocket driven by a timing chain or the like is fixed for rotation with the outer shaft. However, the roles of the inner and outer shafts could just as well be reversed. Thus the entire apparatus is mounted on and supported by the shaft being controlled.

The apparatus inner and outer shafts are speed and phase coupled by means of a strain wave drive of the general type disclosed in U.S. Pat. Nos. 2,906,143; 2,943,508; 3,001,890; 3,117,763; and my U.S. Pat. No. 3,187,605. A drive of that type comprises a pair of coaxial annular internal and external ring or conical gears, one of which is elastically deformable, the other being rigid. A strain wave generator engages the deformable gear to deflect a working surface thereof into engagement with a working surface of the rigid gear at a plurality of circumferentially spaced positions interspaced by non-mating positions. In effect then, the two gears are keyed together at those engaging positions.

In the present apparatus, the outer ring gear is formed in a surface of the tubular outer shaft and the inner gear is formed in a flexible resilient annular surface of revolution positioned concentrically inside the outer shaft and projecting axially from the end of the inner shaft. Preferably, although not necessarily, the inner gear has a special conical-type shape to be described in detail later which minimizes stresses on the gear and on other parts of the apparatus. The driven strain wave generator is rotatively mounted on the inner shaft inside the inner ring or conical gear.

The general operation of a harmonic or strain wave drive is well known. Usually the deformable ring is fixed against rotation and the strain wave generator is rotated at a selected speed. This produces a strain wave which rotates about the deformable gear and causes the rigid gear to rotate in the same direction as the wave generator at a reduced speed relative to the wave generator dependent upon the number of teeth in the two ring gears. For example, if the rigid outer ring has 160 teeth and the inner deformable ring has 158 teeth, the drive will provide a gear reduction ratio of 80 to 1.

In the present apparatus, however, the rotary input is applied, not to the wave generator, but to the rigid outer gear by way of the sprocket and the torque output is taken from the deformable inner gear connected to the inner shaft rotatively fixed to the shaft being controlled. The wave generator always rotates with the deformable gear connected to the output shaft as long as it is not being controlled externally. With this arrangement, as long as the strain wave generator rotates with the output shaft, the outer gear and its sprocket remain rotatively fixed to the shaft. Thus, in effect, the strain wave drive functions as a spline which rotatively keys the sprocket to the shaft so that the two rotate in phase in the same direction.

Further, provision is made in the present apparatus for controlledly rotating the wave generator in one direction or the other relative to the deformable gear secured to the output shaft. This causes relative rotation between the inner and outer ring or conical gears. Accordingly, it permits the driven shaft to be advanced or retarded in phase relative to the sprocket providing, in effect, a variable angle spline between the sprocket and the driven shaft.

The relative motion between the wave generator and the deformable gear is provided by a special traction-type clutch assembly to be described later. Suffice it to say at this point that the clutch assembly can be controlled to stop the rotation of the wave generator relative to the deformable gear so that the wave generator has, in effect, a velocity of $-V$ relative to that gear where V is the velocity of that gear. This causes the output shaft connected to the deformable gear to be advanced in phase relative to the sprocket at a fraction of that speed dependent upon the number of teeth in the two gears i.e., 1/80 V in the above example.

The clutch assembly can also be controlled to cause the wave generator to rotate at twice the speed of the sprocket in the same direction thereby causing the output shaft to be retarded in phase relative to the deformable gear at the reduced speed characteristic of the particular strain wave drive e.g. 1/80 V. Using the clutch assembly, then, while the apparatus is running, the output shaft can be advanced or retarded in phase relative to the sprocket at a rate dependent upon the speed reduction ratio of the particular strain wave drive. For example, the phase of a draw roller connected to the output shaft can be advanced or retarded relative to a main drive coupled to the sprocket to synchronize the phase of the roller with those of other shafts and rollers operating off the main drive.

By the same token, the apparatus can be controlled automatically by the occurrence of remote events. For example, its clutch assembly can be arranged to respond to excessive excursions of a tension sensing dancer so as to advance or retard a web draw roller relative to the line speed to maintain substantially constant tension in a web.

In some applications it is desirable to make the phase change between the output shaft and the sprocket at a plurality of rates. For example, when bringing a roller into registration with a drive shaft, it may be desirable to use a relatively fast rate of correction until the roller is nearly in register and then switch to a slower or finer rate of correction to achieve actual registration. The present apparatus provides for such plural speed phase correction in that a special speed reducing traction planetary assembly to be detailed later may be selectively coupled between the clutch assembly and the strain wave drive. This permits the relative angular velocity of the strain wave generator to be made a fraction of the output shaft speed, e.g. 19/20 V or smaller.

Accordingly when the planetary assembly is active, the output shaft can be advanced or retarded relative to the sprocket at a very small rate equal to the product of the speed reduction provided by the planetary assembly and the speed reduction provided by the strain wave generator, i.e. 1/20×1/80 or 1/1600 V. This is equivalent to about 45° per minute with the output shaft running at 200 rpm. Using the planetary assembly, speed reduction ratios as high as 40,000 to 1 or higher can be obtained. On the other hand, when a faster rate of correction is desired, the planetary assembly can be decoupled from the system permitting the phase correction to take place at the 1/80th relative speed ratio provided by the strain wave drive alone, which is equivalent to about 900° per minute with the output shaft rotating at the 200 rpm speed.

During normal operation, when the sprocket is in the correct phase relationship with respect to the output shaft and the clutch assembly is disengaged so that the strain wave generator is not subjected to external control, all of the components of the strain wave drive including the inner and outer ring gears and the strain wave generator move in unison. Consequently, all torque is coupled directly between the input and output shafts; the strain wave generator does not bear any of this load. Furthermore, during such operation, substantially all of the rotary components of the apparatus move in unison so that there is substantially no parts-wearing relative motion between them as is the case with the prior speed differentials described above.

Torque is indeed coupled through the wave generator when it is necessary to effect a phase change between the input and output shafts. However, it is only coupled in one direction, i.e. from the wave generator to the ring gears and not vice versa. Consequently, even during a phase change, the strain wave generator is not subjected to any appreciable part of the load torque. In the case where the strain wave drive ratio is 80:1, then, the wave generator has to transmit only 1/80th of the line torque during phase changing.

Finally since the apparatus is shaft-mounted and makes the phase corrections between the input and output shafts without any external motive means, it is relatively inexpensive and occupies a very small amount of space so that it can easily be retrofit on existing machinery where available space is at a premium.

BRIEF DESCRIPTION OF THE DRAWINGS

For a fuller understanding of the nature and objects of the invention, reference should be had to the following detailed description taken in connection with accompanying drawings in which.

DESCRIPTION OF AN ILLUSTRATIVE EMBODIMENT

Figure 1:
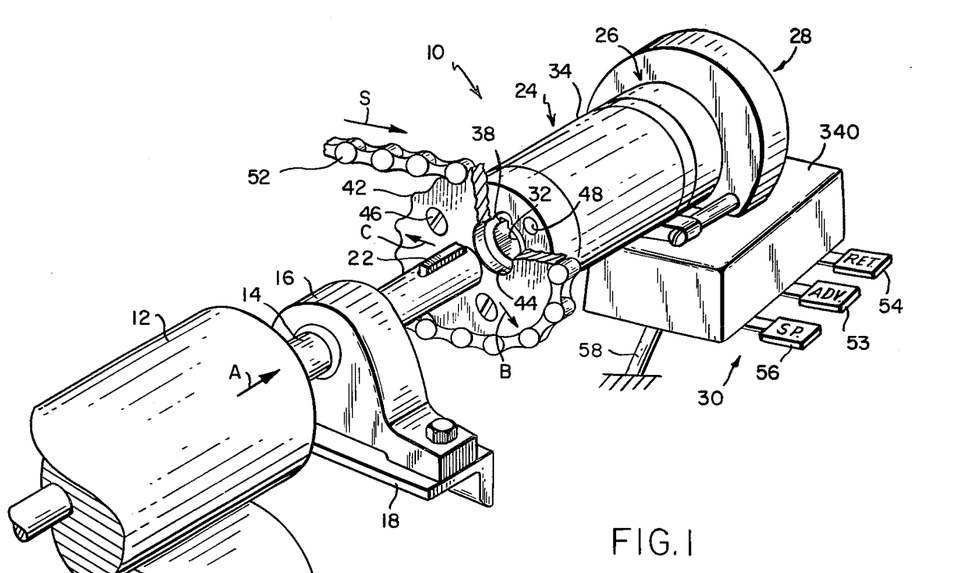
FIG. 1 is a perspective view with parts broken away showing the rotary shaft control apparatus of this invention arranged to couple torque between the sprocket and a roller.

Refer now to FIG. 1 of the drawings which shows my control apparatus indicated generally at 10 arranged to control a rotary member 12. Member 12 may be a draw roller, a rotary cutter, a printing cylinder or the like. For purposes of this description, we will assume member 12 is a draw roller. Roller 12 has a shaft 14, the opposite ends of which are rotatively mounted in bearing units 16, only one of which is shown, the units 16, in turn, being anchored to a machine frame 18. The illustrated end of shaft 14 extends beyond fixture 16 and is fitted with the usual key 22. The apparatus 10 is mounted directly on the projecting end of shaft 14, although in FIG. 1 it is shown separated from the shaft in order to show the interconnection between the two more clearly.

The control apparatus comprises a strain wave drive section indicated generally at 24, a speed reducing planetary section shown generally at 26, a clutch section indicated at 28 and a control section shown generally at 30.

The drive section 24 includes a tubular inner shaft 32 and a concentric tubular outer shaft 34 which is rotatable relatative to shaft 32. To connect the apparatus to the roller 12, the projecting end of roller shaft 14 is inserted into shaft 32, the latter shaft being provided with an internal keyway 38 to accommodate the shaft key 22. Thus when the apparatus is mounted on the shaft 14, the shaft 14 and shaft 32 are rotatively coupled together.

Secured to the end of the outer shaft 34 is a sprocket 42 which is provided with a central opening 44 to loosely accommodate shaft 14. The sprocket is secured to the shaft 34 by means of bolts 46 which are turned down into threaded openings 48 in the end of shaft 34. Thus the sprocket 42 and shaft 34 are rotatively coupled together. Strengthening dowels may be inserted through the sprocket and shaft if necessary. The sprocket is connected via a timing chain 52 to a main drive shaft or other comparable rotary motive source (not shown). Thus the apparatus 10 is suspended from and entirely supported by the roller shaft 14.

When the sprocket 42 is rotated by the timing chain 52, the apparatus drive section 24 couples torque directly to the roller shaft 14 so that the rotation of the two is identical in both direction and phase. Thus for all intents and purposes, the apparatus functions as though the sprocket 42 is keyed directly to the shaft 14 rather than by way of the apparatus 10.

In many cases, however, it is desirable to change the phase angle between roller 12 and the sprocket 42 for one reason or another such as to bring roller 12 into registration or to synchronize it in phase with another roller driven by the same main drive shaft.

Assume, for example, that it is desired to rotate the roller 12 relative to the sprocket so as to bring the arrow A on the roller into registration with the arrow B on the sprocket. Assume further that the sprocket is rotated in the clockwise direction as indicated by the arrows in FIG. 1. By means of the switch control buttons in the control section 30 this can be accomplished quite easily. More particularly, section 30 includes an ADVANCE control button 53 which when depressed causes the clutch section 28 to rotate the output shafts 14 and 32 at a faster rate than the input shaft 34 and its sprocket 42. Consequently the roller 12 is advanced in phase relative to the sprocket. As soon as the two arrows A and B are aligned, the button 53 may be released. Whereupon, the input and output shafts again rotate in unison with the apparatus 10 functioning effectively as a fixed spline between them.

Section 30 also includes a RETARD switch control button 54 which when depressed causes the clutch section 28 to rotate the output shaft 32 at a slower rate than the input shaft 34. Necessarily, then, this causes the roller 12 to be retarded in phase relative to sprocket 14. Using that button 54, the arrow A on roller 12 can be brought into registration with an arrow C on sprocket 42.

Control section 30 also provides for achieving the aforesaid relative rotation between the roller and sprocket at a plurality of different speeds. More particularly, section 30 includes a SPEED CONTROL switch button 56. When the button 56 is in its depressed position, the clutch section 28 acts directly on the drive section 24 so that the relative movement between the roller and sprocket, which occurs when either button 53 or 54 is depressed, proceeds at a relatively rapid rate. On the other hand, when the button 56 is in its raised position, followed by depression of button 53 or 54, the planetary section 26 is coupled between the clutch section 28 and the drive section 24 with the result that the phase correction between the roller and the sprocket occurs at a much slower rate.

Thus by properly manipulating the controls in section 30, the apparatus can be made to vary the phase angle between the roller 12 and the sprocket 42 and its main drive shaft in both directions and at two different speeds.

During normal operation of the apparatus, when the sprocket 42 is in the correct angular relationship with the roller and the two are rotated in unison, there is no net torque applied to sections 28 and 30 at the free end of the apparatus 10. However when the apparatus is functioning to change the relative speed of the sprocket and roller, there is a relatively small reaction torque imparted to those sections which tends to cause them to rotate about the axis of shaft 14. To prevent this, a torque arm 58 is connected at one end to section 30, its opposite end being captured in some convenient manner so that it cannot swing in either direction about the shaft 14 axis. However, it should be understood that the torque arm 58 does not play any part in supporting the shaft-mounted apparatus 10 and the reaction torque is quite small due to the high, e.g. 80:1, gear reduction provided by the drive section 24.

It should be emphasized also that the apparatus depicted in FIG. 1 is complete in that it uses the driving power that passes between the sprocket 42 and the roller 12 to change the relative phase or speed of the sprocket and roller. Accordingly, no auxiliary motor is required for that purpose. Consequently, the entire apparatus can be mounted at the end of shaft 14. For this reason and because it is quite small and compact, the control apparatus can be retrofitted on many existing installations where such shaft control is desired.

Figure 2:
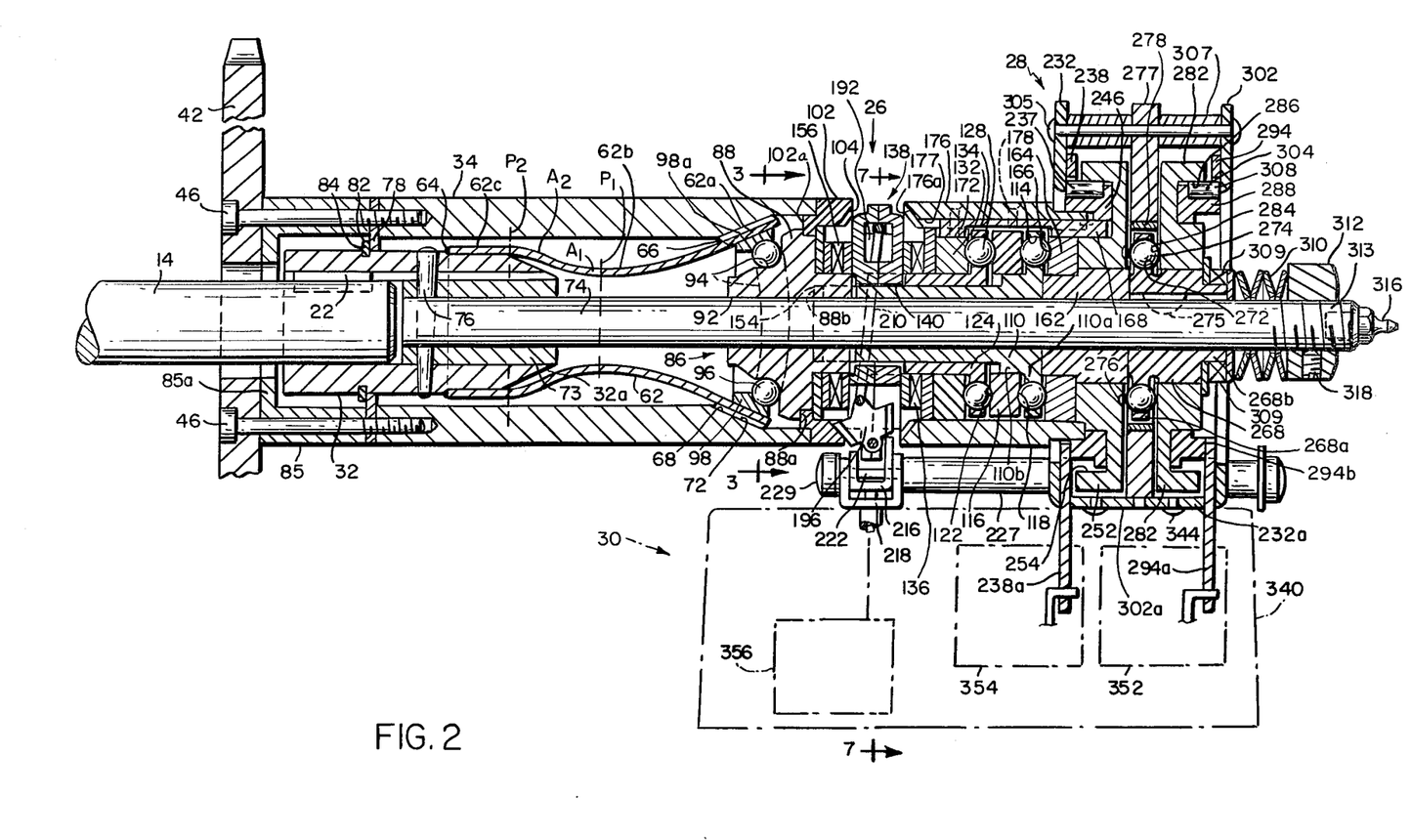
FIG. 2 is a sectional view on a larger scale of the FIG. 1 apparatus.
Figure 3:
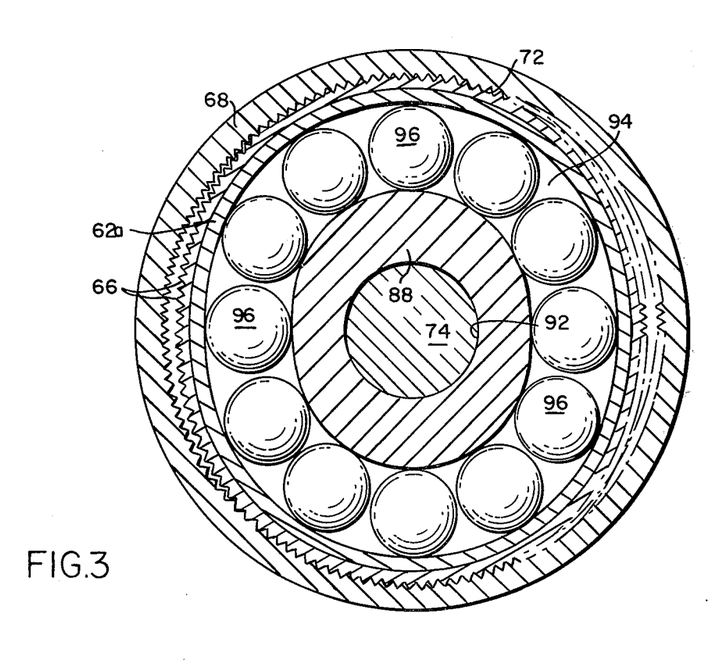
FIG. 3 is a sectional view along line 3—3 of FIG. 2.

Referring now to FIGS. 2 and 3 of the drawings, the strain wave drive section 24 of the apparatus comprises an inner, elastically deformable ring gear 62 which is secured to the inner end of tubular shaft 32 extending out coaxially therefrom. The ring gear 62 is an annular surface of revolution which may be cylindrical as described in U.S. Pat. No. 2,906,143 or conical, spherical or other surface of revolution as depicted in my U.S. Pat. No. 3,187,605.

Most preferably, however, it is in the form of an annular surface of revolution having a so-called "hourglass" shape as viewed in medial section. By this, I mean that the gear 62 has an end section 62a which is conical with a relatively large maximum diameter. Section 62a tapers down to an intermediate section 62b having a much smaller diameter. That section, in turn, flares radially outwardly along a generally circular arc to the cylindrical section 62c which is attached to shaft 32 and which has a larger diameter than section 62b.

The end of the gear section 62c is soldered, brazed or welded to the sleeve by a circumferential bead 64. Also the inner end section 32a of shaft 32 is tapered to provide a clearance space between the shaft and gear 62 to permit the latter to deflect during operation of the strain wave drive section 24. The actual teeth 66 (FIG. 3) of the gear 62 are formed only in the outside surface of the conical gear section 62a. These teeth 66 are spaced equidistant from one another all around section 62a.

The strain wave drive section 24 also includes a rigid outer ring gear 68 which is formed adjacent the inner end of the outer shaft 34. Gear 68 is preferably a conical annular surface of revolution having more or less the same pitch as the deformable ring gear section 62a. It also has a set of gear teeth 72 which have the same spacing and orientation as the inner ring gear teeth 66. However, as is customary with strain wave drives of this general type, the outer ring gear is slightly larger in diameter than the inner ring gear permitting it to have a few more teeth. The actual number of teeth in the two gears depends upon the speed reduction desired to be provided by the drive section 24. In the embodiment of this invention being described, the outer ring gear has 160 teeth while the inner ring gear has 158 teeth. Consequently when the drive is operative during a phase angle correction, it provides an 80 to 1 speed reduction. The specific relationship between the number of gear teeth and the speed reduction provided by such a drive is well known and will not be detailed here.

Still referring to FIG. 2, snugly received inside the inner end of tubular shaft 32 and secured thereto is a sleeve 73 in which one end of a shaft 74 is keyed. The shaft 74 is locked to shaft 32 by a pin 76 extending through diametrically aligned openings in shaft 32, sleeve 72 and shaft 74. Thus the shaft 74, being an extension of output shaft 32, is also an output shaft and it is fairly long so that its opposite end projects beyond the apparatus clutch section 28. A washer 78 having an inner diameter somewhat smaller than the inner diameter of shaft 34 is positioned on the end of the shaft inboard of sprocket 42 as shown in FIG. 2. The washer is rotatively engaged by a split ring 82 seated in an external circular groove 84 in shaft 32 situated just beyond the washer. The washer is held in place by the bolts 46 that secure the sprocket to the end of shaft 34. If desired, a spacer 85 having a reduced diameter end 85a may be included between the sprocket and washer 78 to conceal the end of the inner shaft 32. However, in that event there should be a clearance space between shaft 32 and spacer end 85a.

Still referring to FIGS. 2 and 3, the final component of the strain wave drive section 24 is a strain wave generator shown generally at 86 in FIG. 2. Generator 86 includes a rotary cam 88 having a central opening 92 for rotatively receiving shaft 74. Formed in cam 88 is a cam surface in the form of an elliptical bearing race 94 facing the ring gear section 62a.

Riding in race 94 is an annular set of bearings 96 distributed in a flexible outer bearing race 98 having a conical outer surface 98a arranged to fit flush against the inside surface of the gear section 62a. As best seen in FIG. 2, the race 94 is axially offset in a sinusoidal manner so that at, say, 0° and 180° its surface is relatively close to gear section 62a whereas at 90° and 270°, its surface is further away from that gear section. Actually, the displacement of the race varies as a function of (1-cos $\theta$) in a direction about 23.5° from the cam axis.

When the cam 88 is loaded axially against gear 62, the flexible bearing race 98 is pressed against the gear at diametrically opposite locations thereon corresponding to the positions of the diametrically opposite raised portions of the race 94, i.e. near 0° and 180° in FIG. 2. This axial force deforms gear section 62a from its natural round (in cross-section) shape into an oval or elliptical shape so that the gear teeth 66 adjacent the major axis of the ellipse are pressed into engagement and mesh with the opposite teeth 72 in the outer ring gear 68 as best seen in FIG. 3. On the other hand, the gear teeth 66 adjacent the minor axes of the ellipse, i.e. at 90° and 270°, are drawn away from the corresponding teeth in the outer ring gear sufficiently to clear them also as shown in FIG. 3, the clearance space being exaggerated for clarity.

If now, the cam 88 is rotated on shaft 74 relative to inner gear 62, the diametrically opposite points of toothed engagement between the inner and outer ring gears 62 and 68 will rotate commensurately. As is well known with strain wave drives of this type, if the inner gear is fixed, such rotation causes relative rotary motion between the outer ring gear 68 and the wave generator 86 in the same direction at a greatly reduced speed dependent upon the number of teeth in the two ring gears i.e. an 80:1 speed reduction in this example. On the other hand, if the outer gear is fixed, the inner gear rotates in the opposite direction relative to the wave generator at the same reduced rate.

The illustrated gear 62 is an improvement on the one described in my aforementioned U.S. Pat. No. 3,187,605. That patent describes a deformable element for a strain wave drive consisting of a non-cylindrical body of revolution which is adapted for deflection with three degrees of freedom. Among the illustrative gear embodiments in that patent is a conical body of revolution which produces significant advantages over the then known prior art in terms of ease of manufacture and flexibility in the choice of gear characteristics. While the stress imposed upon that deformable gear in use is significantly less than that encountered by the cylindrical gears of the type described in the aforementioned U.S. Pat. No. 2,906,143, the stress is still higher than it should be.

This is because in order for the gear to have a high torque coupling capability, e.g. 300 inch pounds, its wall thickness must be relatively large. This of course makes the gear quite stiff. Consequently, the wave generator which deflects that gear against the rigid outer gear during operation of the drive must be highly loaded axially against the gear. Indeed axial forces as large as 400 pounds are required in order to enable the drive to operate properly. Such a high loading force can impose stresses on the deformable gear as high as 78,000 psi or more. In order to be able to withstand these stresses, the gear must be made of expensive material such as 52100 steel which is difficult and expensive to machine. Even then, the operating life of the gear is not as long as it might be. In addition, however, that high axial load is also imparted to the other components of the drive such as bearings, rings, cams, etc. Consequently, those parts as well must be fabricated using expensive materials which must then be machined to tolerance.

While analyzing the operation of these deformable gears, I found that a non-cylindrical body of revolution such as a cone as the deformable gear in a strain wave drive functions more or less like a spring. In other words, there is a substantially linear relationship between the deflection of the toothed rim of the gear and the axial load applied to the wave generator deflecting the gear, which load is proportional to the axial displacement of the wave generator, i.e. deflection equals the product of a constant and axial displacement which is the equation for a simple spring. I found also that due to the angulation of a conical surface of revolution, its absolute slope decreases as the gear disengages from the rigid gear teeth during operation of the drive. Consequently, I concluded that it is not necessary to deflect the gear by an amount equal to twice the tooth height as is usually done in such drives. Rather the drive should operate properly if the deformable gear is deflected by a lesser amount equal to twice the tooth height minus the angulation factor. That factor can be particularly large in the case of a cone.

Thus for example, a cone angle of 22.5° as measured between the cone axis and one side, a 60° tooth angle and 160 teeth for a chosen diameter will yield a tooth measuring about 0.032 inch. This normally implies (using the standard deflection of twice the tooth height) a differential between the major and minor axes of the deformable gear of 2 times 0.032 or 0.064 inch. However, my experiments have shown that in the case of a cone, this difference need only be about 0.031 inch, or about half that amount.

Consequently, a relatively small axial loading force on the drive, e.g. 40 pounds, should suffice provided the gear has a sufficiently low spring constant.

The spring constant in the case of such bodies of revolution is a function of several parameters such as length, diameter, wall thickness, type of material and also the shape of the body between the portion thereof carrying the teeth 66 and its connection to the torque take-off means, i.e. shaft 32. Of these factors, I decided that the gear shape would have a particularly significant effect on the spring constant of the gear.

A gear composed of a non-cylindrical body of revolution such as the present one naturally tends to angulate in the manner of a system of cantilevered beams connecting the ring of teeth formed thereon at the polar axis of rotation of the body as described in my patent. However, the connection of a torque take-off means such as a sleeve or shaft to such a gear in the usual way at a location spaced from the polar axis upsets the normal conical angulation of the gear and thereby causes the teeth to angulate about the boundary between the torque take-off means and the gear. This produces unnatural stresses in the gear. More importantly it renders the gear stiffer than it would be if it could angulate naturally.

In a cone, for example, portions of the body tend to angulate about the apex of the cone lying on the polar axis. Therefore the formation of a torque take-off sleeve on or integral with the cone and which is located an appreciable distance from that apex toward the teeth prevents the toothed portion of the cone from angulating properly about the apex. Rather, the cone is constrained to angulate about the circular boundary between the cone and the sleeve thereby rendering the gear stiffer and subjecting it to unwanted stress. In attempting to avoid this problem, I concluded that since a conical body naturally angulates about its apex, the torque take off means should be connected to the conical portion of the gear at a maximum diameter such that the conical action is still maintained while at the same time providing a sufficient polar moment of inertia in the gear to permit taking off a useful torque.

In this connection, it should be understood that motions do exist in the medial plane $P_1$ (FIG. 2) that passes through the minimum diameter of the gear. These motions are both radial and axial and are different around the polar axis of the gear. Any further means secured to that plane to take off torque can inhibit those motions and increase the stress in the gear.

I concluded, therefore, that the portion of the gear beyond that minimum diameter plane should increase in diameter with a smooth transition along more or less mirror image circular arcs $A_1$ and $A_2$ to a new medial plane $P_2$ in which such radial and axial motions are not present, although they do not exist between the two planes. At the latter plane $P_2$ the first contact with and connection to the torque take-off means, i.e., shaft 32, is made.

In other words, the connection should be made along a circular boundary at $P_2$ positioned radially outward along mirror image spherical segments from the smaller diameter end of the conical section at $P_1$ as best seen in FIG. 2. In this way, the securement of the torque take-off means 32 to the gear 62 has minimal effect on the natural angulation of the toothed conical section 62a.

For purposes of the present apparatus 10, the gear 62 illustrated in FIG. 2 provides the desired toothed engagement with the outer ring gear with an axial load on the wave generator of only about 40 pounds. Therefore the stress imparted to the gear when the drive is operative is relatively low, i.e. about 28,000 psi. Consequently, the gear can be die-formed in a few steps from an ordinary inexpensive cold-rolled steel tube. Further, the other axially loaded components of the apparatus can likewise be cast or otherwise formed easily from inexpensive materials such as powdered metal which cast parts are quite able to withstand such relatively low stress.

Figures 7, 8, 9:
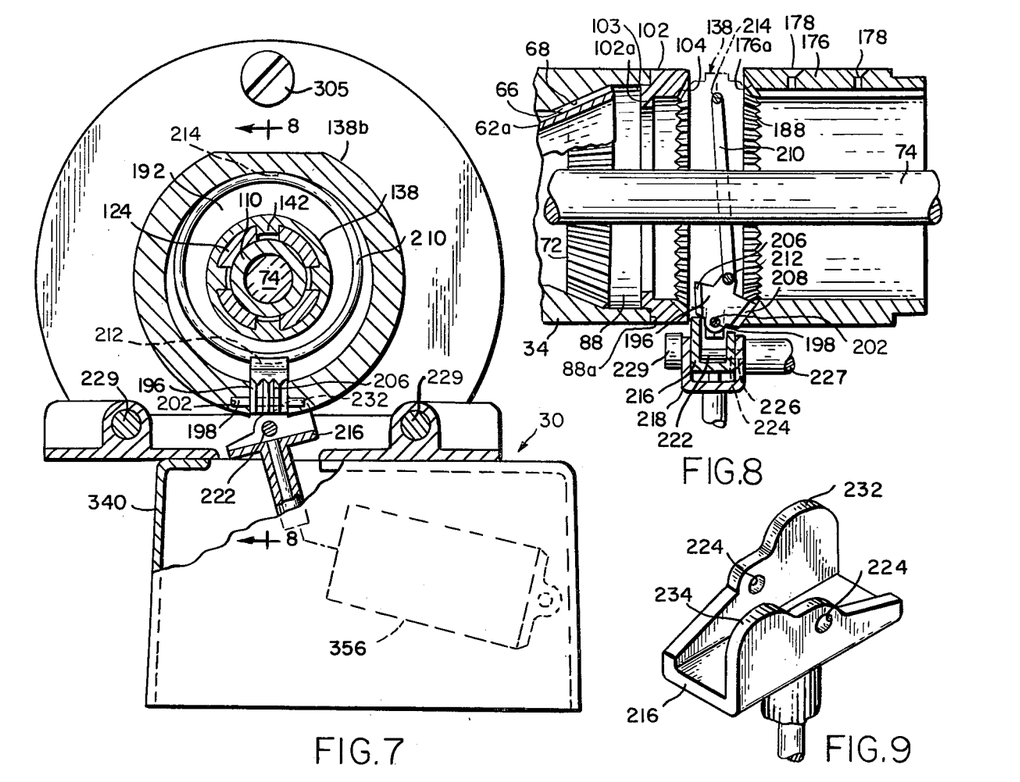
FIG. 7 is a sectional view along line 7—7 of FIG. 2 showing the speed shift key in one position.
FIG. 8 is a sectional view along line 8—8 of FIG. 7 with parts cut away for clarity showing the shift key in its other position.
FIG. 9 is a fragmentary perspective view showing the shift key cam portion of the apparatus in greater detail.

As best seen in FIGS. 2 and 8, seated on the inner end of shaft 34 is a circular collar 102 having a reduced diameter neck 102a which fits inside shaft 34 and rotatively engages a shoulder 88a of the rotary cam 88. The collar 102 is keyed at 103 for rotation with the shaft. The cam 88 has a reduced diameter neck 88b which projects along shaft 74 more or less to the end of the collar 102. The exposed end of collar 102 is beveled and formed with teeth so that it constitutes a female bevel gear 104 (FIG. 8) which actually constitutes part of the speed reducing planetary section 26 is to be described presently.

Figures 4, 10:
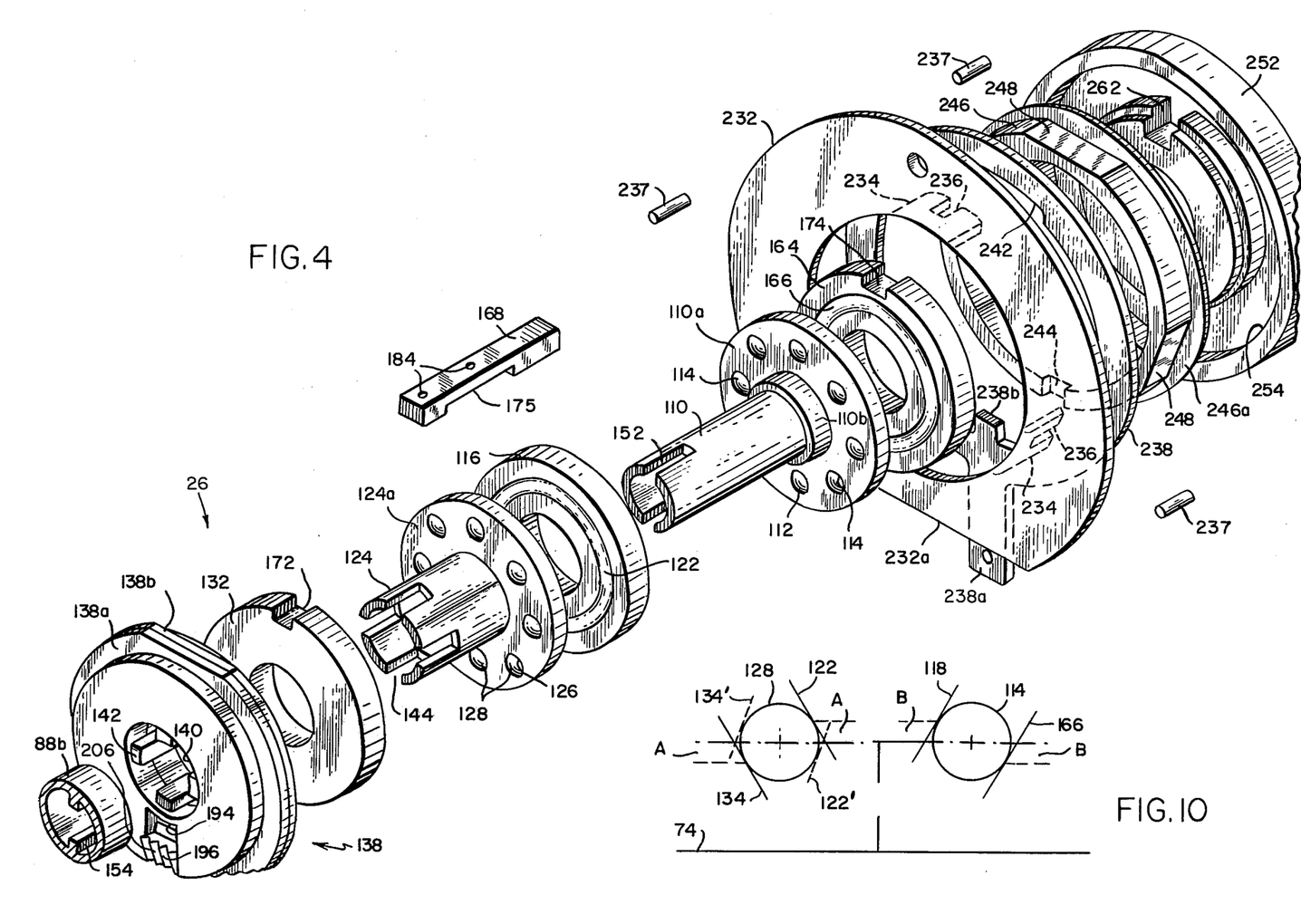
FIG. 4 is an exploded perspective view showing various components of the FIG. 1 apparatus in greater detail.
FIG. 10 is a similar view illustrating the operation of the planetary portion of the apparatus.

Turning now to FIGS. 2 and 4, the planetary section 26 includes a so-called reduction tube 110 which is a tubular member rotatively supported on shaft 74. Tube 110 is formed with a radial flange 110a having a circumferential array of openings 112 which form cages for a corresponding array of ball bearings 114. Tube 110 is rotatively received on shaft 74 at a location spaced from collar 102. Rotatively seated on a reduced diameter neck 110b on tube 110 is a circular ring 116. The side face of ring 116 facing the tube flange 110a is formed with a circular race 118 (FIG. 2) for receiving the bearings 114. The opposite face of the ring is formed with a similar circular race 122.

Rotatively mounted on tube 110 to the left of ring 116 is a so-called drive tube 124. Tube 124 is similar to tube 110 in that it has a radial flange 124a formed with a circular array of openings 126 for caging an array of ball bearings 128. These bearings are arranged to ride in the race 122 in ring 116.

Rotatively mounted on the drive tube 124 is a second ring 132. The side of the ring facing tube 124 is formed with a circular bearing race 134 (FIG. 2). Also received on drive tube 124 to the left of ring 132 is a circular thrust bearing 136 illustrated in FIG. 2. That bearing is not shown in FIG. 4 for reasons of drawing clarity.

Finally, positioned on tube 124 beyond the thrust bearing is an annular reduction disk shown generally at 138 whose function will be described later. Suffice it to say at this point that the disk 138 has an inner opening 140 engaging around tube 124. Also a circumferential array of axial keys 142 are formed in the wall of opening 140 which interfit with correspondingly shaped and located keyways 144 in the end of the drive tube 124 so that the drive tube and disk 138 rotate together.

As best seen in FIG. 2, when the drive tube 124 with all of its encircling components is engaged on tube 110, the end of the tube 110 projects somewhat beyond the end of tube 124. That projecting end is provided with a pair of diametrically opposite axial keyways 152 (FIG. 4) which are arranged to receive correspondingly shaped and located keys 154 formed in the inside wall of the cam neck 88b. Also, a thrust bearing 156 (FIG. 2) is engaged around the cam neck which reacts between the shoulder 102a of ring 102 and the reduction disk 138.

Thus when the planetary section 126 is coupled to the drive section 24 and more specifically when the reduction tube 110 is keyed to the cam neck 88b, as shown in FIG. 2, the reduction tube and cam 88 are rotatively locked together.

Referring still to FIGS. 2 and 4, rotatively mounted on shaft 74 beyond reduction tube 110 is a bushing 162 (not shown in FIG. 4) and encircling the bushing adjacent the reduction tube flange is a circular ring 164 which is more or less a mirror image of ring 132. As such it has a circular bearing race 166 for receiving the ball bearings 114 carried by the tube 110, the bushing 162 and ring 164 actually forming part of the clutch section 28 to be described later.

A generally rectangular key 168 is provided to rotatively couple the rings 132 and 164. One end of the key is arranged to fit in a keyway 172 in the rim of ring 132, while the opposite end of the key seats in a similar keyway 174 formed in the rim of ring 164 and projects an appreciable distance beyond that ring. A relatively long notch 175 is formed in the underside of the key to provide clearance for tubes 110 and 124 and the intervening ring 116.

As best seen in FIGS. 2 and 8, encircling the key is a sleeve 176 (not shown in FIG. 4) having an internal keyway 177 for receiving key 168. The sleeve is positively secured to the key by means of set screws 178 extending through countersunk openings in the sleeve and turned down into threaded openings 184 in the top of the key. As best seen in FIG. 8, the end 176a of sleeve 176 outboard of bearing 136 and facing disk 138 is beveled and provided with teeth, thereby forming a female bevel gear 188 located directly opposite the comparable gear 104 in collar 102.

Referring now to FIGS. 4, 7 and 8, the speed reduction disk 138 in the planetary section 26 is actually composed of two shell halves 138a and 138b which are more or less mirror image of one another so that when the two halves are brought together and secured at their edges, they define an annular space 192 inside the disk. Also each disk half is formed with a generally rectangular slot 194 near its edge, the two slots being in register thereby forming a window through the disk.

Positioned between the two slots 194 (FIGS. 4 and 7) inside the disk is a so-called gear shift key 196. The key is pivotally mounted to the disk by means of a pin 198 extending through an opening in the outboard end of the key with the ends of the pin being staked in registering passages 202 in the two disk halves near their rims.

The pin 202 is oriented so that it is perpendicular to the sidewalls of the slots 194. This permits the key to pivot between one position wherein the key projects out through the slot 194 at one side of the disk as shown in FIG. 2 and another position wherein it projects out through the slot 194 at the opposite side of the disk, as seen in FIG. 8. The opposite sides of the key which project through the slots are formed with sets of male bevel gear teeth 206 and 208. When the key is in its said one position, its teeth 206 mesh with the bevel gear 104 in collar 102. When the key is in its other position, its teeth 208 mesh with the bevel gear 188 in sleeve 176.

Positioned in the annular space 192 inside the disk is a tightly coiled length of spring wire whose ends overlap to form a circular spring 210. One side of the spring seats in a notch 212 formed in the end of the gear shift key opposite its pin 202, as best seen in FIGS. 7 and 8. A diametrically opposite point on the spring is captured by lateral projections 214 in the two disk halves. The positions of the notch 212 and the pin 202 are such that the gear shift key is over center when moved near either of its two aforesaid positions. In other words, the key is a bistable element whose teeth either mesh with bevel gear 104 in collar 102 or with bevel gear 188 in sleeve 176.

The gear shift key is switched between its two stable positions by means of a channel-shaped cam 216 shown in detail in FIG. 9. The cam is pivotally supported in a generally U-shaped channel 218 by means of a pivot pin 222 extending through openings 224 in the opposite side walls of the cam and through registering openings 226 in the opposite side walls of the channel. The channel 218 is spaced in front of clutch section 28 by spacers 227 and supported therefrom by bolts 229 (FIG. 2) so that cam is located directly below the gear shift key 196.

As best seen in FIG. 9, the opposite side walls of the cam are formed with two raised lobes 232 and 234 which are symmetrically disposed about the pivot pin openings 224. The shapes of the lobes are such that when the cam is pivoted in one direction about its pin 222, its lobe 234 is raised and engages the gear shift key 196 and moves the key over center so that it snaps into gear 104 as shown in FIGS. 2 and 7. On the other hand, when the cam is tilted in the opposite direction, its lobe 232 is raised and engages the opposite side of the key, thereby snapping the key to its other position wherein it meshes with sleeve 176 as shown in FIG. 8. The cam is tilted between its two positions by the apparatus control section 30 as will be described later.

It should also be appreciated at this point that during operation of the apparatus, the disk 138 may rotate with tube 124 relative to cam 216 and channel 218. Therefore the key 196 can only be switched between its two positions as it swings by the cam 216. If the key is already in the desired position as selected by the control section 30 when it swings past the cam, the cam will have no effect on the key. However, if the key is in its opposite position, as soon as it strikes the cam, it will be switched to its desired position.

As mentioned at the outset, the function of the planetary section 26 is to enable the clutch section 28 to rotate the wave generator 88 relative to the deformable gear 62 in drive section 24 at two different speeds as selected by control section 30. This is accomplished by means of the shift key 196 through the action of the reduction tube 110, the drive tube 124 and their associated bearings and races. These are not simple bearing systems as appears in the drawings. Rather, the races on rings 116, 132 and 164 may have slightly different radii. Moreover, the bearings 114 on tube 110 are lubricated by or coated with a special lubricant which, when subjected to high pressure, has a high co-efficient of traction. This occurs when the bearings are subjected to an axial load as is the case in the present apparatus. Under relatively low pressure, the material functions as an ordinary lubricant. A suitable lubrication material to produce this effect is sold by Monsanto Chemical Co. under the trade name SANTOTRAK. With an axial thrust on the coated bearings of about 40 pounds, this material produces about 4 pounds of rotary or shear force. As such, the bearings and their races function more or less like meshing gear teeth in a planetary gear system.

More particularly and referring to FIGS. 2 and 4, assume shaft 74 is stationary. When ring 164 in clutch section 28 rotates relative to the shaft, so does ring 132 and sleeve 176 because of the interconnecting key 168. If the shift key 196 is in its FIG. 8 position wherein it meshes with gear 188 on the sleeve 176, the disk 138 also rotates along with those other components. As just described, the bearings 114 and 128 on tubes 110 and 124 respectively and the opposing bearing races on rings 116, 132 and 164 function effectively as gear teeth. With this in mind, it is apparent that reduction tube 110 will rotate with ring 164 by virtue of its bearings 114 engaging that ring. Also ring 116 captured tractively between bearings 114 and 128 will rotate along with those other components. Since all of these components are rotating in the same direction and speed, the wave generator 86 coupled to reduction tube 110 will rotate along with them in the same direction and at the same speed as ring 164. Thus there is a one-to-one speed coupling between ring 164 and the wave generator.

Assume now that the key 196 is switched to mesh with gear 104 on collar 102 attached to input shaft 34 as shown in FIGS. 2 and 7. Rings 132 and 164 and sleeve 176 rotate together as before. Now, however, disk 138 as well as drive tube 124 coupled thereto are rotatively locked together. Further the outer ring gear 68 and the input shaft 34 coupled thereto rotate at 79/80 of the shaft 74 speed due to the 80:1 speed reduction provided by drive section 24. Therefore, for purposes of this discussion they can be considered to rotate essentially at the shaft speed, i.e. zero in this example. Therefore the drive tube 124 is also essentially stationary.

With this arrangement, the rotating ring 132 acting through the tractively captured bearings 128 in tube 124 cause ring 116, also engaged by bearings 128, to rotate at the same speed but in the opposite direction. As such, it also rotates oppositely to ring 164 keyed to ring 132. This means that the bearings 114 on reduction tube 110 are tractively captured on each side by rings 116 and 164 which rotate at the same speed but in opposite directions.

If the radii of the races on rings 116, 132 and 164 were equal, then the bearings 114 would simply rotate about their axes and no torque would be coupled to tube 110 and wave generator 86 would be stationary along with shaft 74. However, as alluded to previously, those radii are not equal. Rather as shown in the FIG. 10 diagram, the balls 128 on tube 124 contact races 134 and 122 on rings 132 and 116 respectively at points displaced from the ball axis by distances $-A$ and $+A$ respectively, the ball axis being spaced a unit distance from the shaft 74 axis. In other words, race 122 has a slightly larger radius than race 134. On the other hand, the balls 114 on tube 110 contact races 118 and 166 on rings 116 and 164 respectively at points displaced from the ball axis by distances $+B$ and $-B$ respectively, distances A and B being different.

Using standard equations for planetary gearing, it can be shown that, when the keyed-together rings 132 and 164 are rotated relative to shaft 74, the rotation of the tube 110 with respect to those rings may be expressed as follows:

$$\text{speed difference} = \tfrac{1}{2}\left(1 - \frac{1+2B}{1+2A}\right)$$

Therefore by inserting various values of A and B simply by substituting different rings, the planetary section 26 can be made to produce different speed reduction ratios for different applications of the apparatus 10. The races on the two rings can even be angled in the same direction as specifically shown by the dotted line races 134' and 122' in FIG. 10. The following Table I shows various ratios obtained by planetary section 26 for different values of A and B.

TABLE I

| Ex. | A(inch) | B(inch) | Speed Reduction Ratio |
|---|---|---|---|
| 1 | .027 | .030 | 357:1 |
| 2 | .028 | .030 | 526:1 |
| 3 | 0 | .030 | 33:1 |
| 4 | 0 | .015 | 67:1 |
| 5 | .025 | .030 | 208:1 |
| 6 | 0 | .050 | 20:1 |

Planetary section 26 in the illustrated apparatus 10 produces a reduction ratio of 20:1. Therefore, the race radius values of Example No. 6 may be employed. Section 26 will produce that speed reduction whichever direction the rings 132 and 164 rotate relative to the shaft 74. Therefore, when the shift key 196 is in its FIG. 2 position so that section 26 is operative, the total speed reduction ratio between the wave generator and the output shaft is the product of that provided by planetary section 26, i.e. 20:1 and that provided by drive section 24, i.e. 80:1 or a total of 1600:1 in this example.

Figure 5:
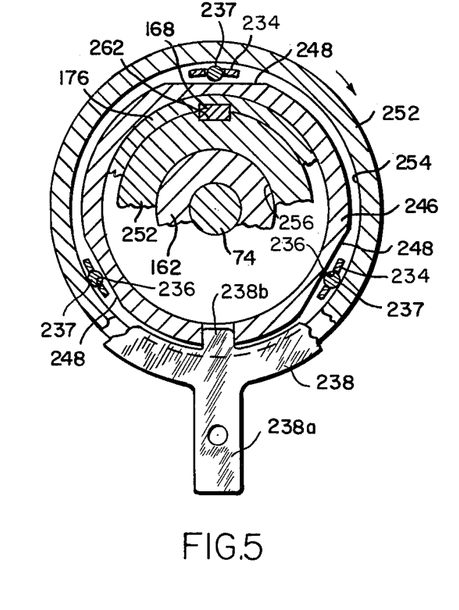
FIG. 5 is a sectional view with parts cut away along line 5—5 of FIG. 2 on a smaller scale showing the clutch assembly of the FIG. 1 apparatus with the clutch disengaged.

Referring now to FIGS. 2, 4 and 5, the clutch section 28 includes a circular annular plate 232 whose lower edge is bent back to form a horizontal tab 232a which rests on the apparatus control section 30. Also formed at the inner edge of the plate 232 are three laterally extending tabs 234 spaced 120° apart around the plate. These tabs are slightly curved (FIG. 5) having a radius corresponding to the radius of the inner edge of the plate. Also each tab 234 has a generally rectangular slot 236 extending in from one end. Each slot cages a dowel or roller bearing 237. During assembly, the dowels may be temporarily retained in their slots by an application of grease.

Plate 232 loosely engages over sleeve 176 of the planetary section 26. Positioned just beyond plate 232 is a flat annular clutch dog 238 which loosely encircles the tabs 236 in the frame plate. To assure adequate clearance between those elements, the clutch dog 238 is formed with three notched sectors 242 (FIG. 4) at its inner edge spaced approximately 120° apart and located directly adjacent the tabs 234. The clutch dog is also formed with a depending handle 238a by which the dog can be cocked or rotated. Also directly above handle 238a a key 238b projects radially inward. This key is arranged to fit in a keyway 244 in a clutch ring 246 positioned just beyond the dog so that the dog and the clutch ring 246 move together.

As best shown in FIGS. 2, 4 and 5, the outside surface of the clutch ring 246 is formed with three flats 248 which are spaced 180° apart around the ring and are located directly opposite the tabs 234 on the frame plate 232. Also, the clutch ring has a radial flange 246a at its far end which extends radially outward beyond the flats. The ring 246 is arranged to nest in a clutch plate 252 whose face is formed with an annular channel 254 which is dimensioned to relatively loosely receive the clutch ring 246. The clutch plate is formed with a central opening 256 (FIG. 5) which is arranged to engage over the larger end of the bushing 162 on shaft 74.

With the clutch ring 246 seated in the clutch plate 252, the clutch plate is engaged over bushing 162 beyond the frame plate 232 and dog 238 as shown FIGS. 2 and 5 so that the dowels 237 are captured between the outer wall of groove 254 in the clutch plate and the flange 246a and flats 248 on the clutch ring as best seen in FIG. 2. Also as shown in FIGS. 4 and 5, the inner wall of the clutch plate groove 254 is formed with an axial keyway 262 which is arranged to receive the projecting end of the key 168 extending out from the planetary section 26. Thus, when the clutch plate 252 is seated, it is rotatively locked to the ring 164, ring 132 and sleeve 176 by the key 168. On the other hand, the dog 238 and clutch ring 246 are rotatively locked together, but free to cock relative to the aforesaid components.

Positioned on the output shaft 74 beyond bushing 162 is a drive tube 268 having a radial flange 268a formed with a circular array of openings 272 which cage an array of ball bearings 274. These bearings are lubricated with the same tractive material described above. Tube 268 is rotatively keyed to shaft 74 at 275 and thus rotates with the shaft, but it may move longitudinally to some extent relative thereto.

As shown in FIG. 2, the bearings 274 carried by tube 268 ride in a circular race 276 in the adjacent face of the clutch plate 252. Also, encircling the rim of the cage is an annular so-called reference plate 277 carrying a brass bushing 278 at its inner edge which snugly engages around the tube flange 268a, but permits its rotation.

Positioned beyond and encircling the neck portion of tube 268 is a second clutch plate 282 which is more or less a mirror image of plate 252 in that it is formed with a circular race 284 in its face adjacent tube flange 268a which functions as a race for the bearings 274. Also it has a circular groove 286 formed in its opposite face more or less in line with the groove 254 in plate 252.

Seated in groove 286 is a clutch ring 288 which is more or less a mirror image of the clutch ring 246 in that its outer surface is formed with three flats (not shown) spaced 120° apart which are aligned with the similar flats 248 in ring 246. Positioned beyond the clutch ring 288 is an annular dog 294 more or less identical to dog 238 in that it has a depending handle 294a and an upstanding key 294b which engages in a keyway (not shown) formed in the rim of the clutch ring 288 at the bottom of the ring. Thus the dog and clutch ring rotate together about the shaft 74 axis.

Positioned beyond the clutch ring is an end plate 302 which is essentially a mirror image of plate 232 in that its lower edge is bent laterally to form a tab 302a that seats on the control section 30. The plate is provided at its inner edge with three laterally extending tabs 304 spaced 120° apart located directly opposite the flats on the clutch ring 288. As with plate 232, these tabs cage a set of three pins or dowels 308 which extend between the clutch ring flats and the outer wall of groove 286 in the clutch plate 282.

The three plates in section 28 are held together at their tops by a pin or bolt 305 extending through aligned openings in those plates, suitable spacers 307 being provided between the plates to permit rotation of the clutch plates 252 and 282. The bottoms of those plates are held together by the bolts 229 supporting channel 218, appropriate spacers (not shown) being provided there as well.

Clutch section 28 operates as follows. The drive tube 268 rotating with shaft 74 normally causes the adjacent clutch plates 252 and 282 to rotate in the same direction and speed. This is due to the tractive nature of the lubricant on bearings 274 when the system is under axial load as described above. Assume, for example, that tube 268 is rotating clockwise at speed V. If now the clutch plate 252 is stopped, the clutch plate, as well as the rings 132 and 164 in apparatus section 26 keyed thereto, will have a velocity of $-V$ relative to shaft 74.

On the other hand, if plate 252 is allowed to rotate and plate 282 is stopped, then plate 252 and the rings 132 and 252 will rotate relative to the shaft 74 at a speed equal to the surface speed of the bearings 274, i.e. $+2V$ minus the speed of tube 268, i.e. $-V$, or $+V$. Thus by stopping one or the other of the clutch plates, the ring 164 that drives the planetary section 26 can be made to rotate in one direction or the other at a speed V relative to the output shaft.

The clutch plates 252 and 282 are stopped by actuation of the clutch dogs 238 and 294, respectively by control section 30. Since the two dogs operate identically, we will only describe the functioning of the former one in detail.

Figure 6:
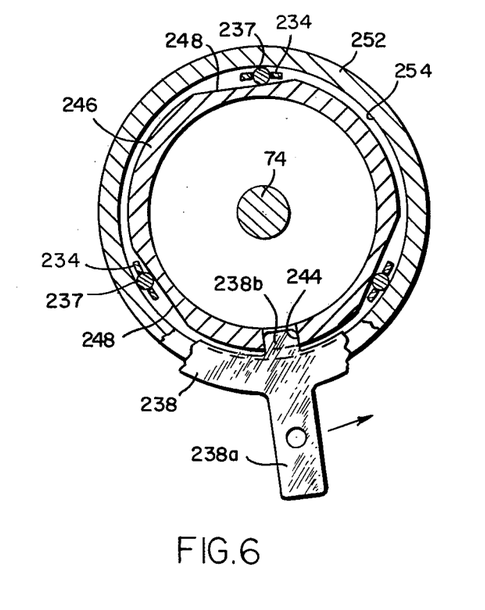
FIG. 6 is a view similar to FIG. 5 with certain elements omitted for clarity, showing the clutch engaged.

Referring to FIGS. 5 and 6, when the dog 238 is in its disengaged position shown in FIG. 5, the flats 248 of clutch ring 248 are centered on the dowels 237 caged by the stationary tabs 234. In this position, the dowels 237 do not bear appreciably against the wall of the groove 254 in the clutch plate. Therefore the plate is free to rotate with drive tube 268 as described above. Assume for example, it is rotating clockwise as shown by the arrow in FIG. 5.

If now the dog 238 is rotated slightly to its engaged position illustrated in FIG. 6, the clutch ring 246 is cocked so that its flats 248 wedge the dowels 237 against the groove wall of clutch plate 252. This wedging action brings the plate 252 to a rapid but smooth stop. In a general sense, then, the clutch ring, clutch plate and dowels cooperate to form a sprag clutch or brake. In a conventional sprag clutch, however, when the clutch is being engaged the rings or plates on the opposite sides of the pins or dowels move in the same direction so that the pins tend to be rolled and squeezed into the wedge. This makes it relatively difficult to disengage the usual sprag clutch. Here, however, when engaging the clutch, the plate 252 and ring 246 are rotating in opposite directions so that the dowels 237 have less tendency to become "bound up" in the wedge between those two members. Accordingly, it is easier to disengage the clutch by returning the dog to its original FIG. 5 position. Since the clutch is moved to its engaged position by a solenoid in control section 30 and disengaged by a return spring acting on the dog, a lighter spring may be used permitting use of a smaller and less expensive solenoid than could be used to operate a conventional sprag clutch.

Clutch dog 294 is operated in the same way to wedge the dowels 308 between clutch ring 288 and the groove wall in clutch plate 282 to stop that plate and that clutch arrangement has the same benefits as the one described above.

Referring again to FIG. 2, encircling a reduced diameter neck portion 268b of the drive tube 268 is a thrust bearing 309 and beyond the thrust bearing, a stack of Belleville washers 310 encircle shaft 74. Finally, beyond the washers is a threaded nut 312 which is turned down onto corresponding threads 313 at the end of shaft 74. If desired, a grease fitting 316 may be screwed onto the end of the shaft and the shaft may be formed with an axial passage (not shown) and connecting lateral ports (not shown) in FIG. 2 in order to deliver the tractive-type lubrication to the bearings on the various rotary tubes. Desirably also, the nut 312 is positively locked to the shaft by a set screw 318 to firmly fix its position thereon.

As the nut 312 is turned down onto the shaft, the Belleville washers 310 apply an axial load to the wave generator 86 by way of the various rotary components slidably mounted on the shaft 74 in sections 26 and 28. The wave generator 88 and the bearing race 98 carried thereby are thus biased against the deformable inner drive gear 62 thereby deflecting section 62c of that gear into its elliptical shape so that its teeth engage the teeth of the rigid outer ring gear 68 at diametrically opposite locations thereon as described above. Because of the special shape of gear 62 described above, an axial force of only about 40 pounds suffices for this purpose. That force is also large enough to create sufficient pressure at the points of contact between the bearings and their races to impart the required coefficient of traction to the bearing lubricant at those locations. However the axial load is low enough so that there is minimum wear of the axially loaded bearings, rings and washers and minimum energy loss when rotating those elements relative to one another.

The applied axial load can also be adjusted to change the difference between the major and minor axes of the deformable gear 62 in order to adjust the angulation factor thereof discussed above. In other words, if the axial force is increased, the difference between the major and minor axes in a corresponding radial plane also increases in proportion to the gear spring constant so that the spacing between the unengaged tooth points is greater. Conversely, if the axial load is decreased, the spacing between those tooth points is decreased.

It should be emphasized at this point also that the components of the present apparatus are not critically dimensionally dependent since they are force loaded. Accordingly, there is no tolerance accumulation problem. In other words, the interactive components of the apparatus, including the wave generator 86, the ring gears and bearing elements, clutch plates, etc. are all face-to-face-contacting components which are maintained in the proper engagement by the axial load imposed by the Belleville washers 310. The apparatus does not utilize any rim-engaging gears, spiders or other dimensionally critical gear trains found in the prior rotary shaft control apparatus. Consequently apparatus 10 is much easier and less expensive to manufacture and assemble than those prior devices. Furthermore for the same reasons, the apparatus suffers little or no backlash even if the drive section 24 gear teeth or the bevel gears in section 26 become worn in use because the gears are always axially biased together.

Referring to FIGS. 1, 2 and 7, the control section 30 comprises a housing 340 which is secured to the plate flanges 232a and 302a by bolts 344 (FIG. 2), suitable slots being provided in the top wall of the housing to accommodate the dog legs 238a and 294a. The housing 340 contains three solenoids 352, 354 (FIG. 2) and 356 which control the above-described movements of the dogs 294 and 238 in section 28 and the gear shift cam 216 in section 26 respectively. Those three solenoids are, in turn, energized by the switch buttons 54, 53 and 56 respectively depicted in FIG. 1. The circuitry for energizing the solenoids by means of the switches and the mechanical linkages between the solenoid armatures and the dogs and cam are conventional and will not be detailed here. Suffice it to say that these buttons are normally biased upwards in their solenoid-off positions so that dogs 238 and 294 are in their desengaged positions shown in FIG. 5 and cam 216 is in its key-engaging position of FIG. 2.

During normal operation of the apparatus, the buttons 53, 54 and 56 are in their raised positions so that the dogs 238 and 294 are positioned to permit rotation of the two clutch plates 252 and 282. Also the shift cam 216 is positioned to place the shift key in engagement with the bevel gear 104 as shown in FIG. 2. We will assume that the shaft 74 and roller 12 are rotating clockwise at a speed V and that shaft speed will be used as the speed reference for purposes of the following discussion. In this normal mode of operation, as described above, the rotary components of the clutch section, namely clutch plates 252 and 282 rotate at the shaft speed V. That motion is coupled by key 168 to the rotaty components of the planetary section 26 which also rotates at the shaft speed V. Likewise the reduction disk 138 coupled to the bevel gear 104 by the shift key 196 also rotate at the same shaft speed, as does the input shaft 34 to which the that bevel gear is connected.

With all of the rotary components of the apparatus turning together, there is no relative motion between the wave generator and the inner and outer ring gears in the drive section 24. Accordingly, the input shaft 34 is essentially keyed to the output shafts 32 and 74 and the roller shaft 14 coupled thereto. Thus torque is coupled directly between the input and output shafts by way of the ring gears 62 and 68. No load torque is coupled to the wave generator 86 or through the wave generator 86 to the apparatus sections 26 and 28. Moreover, in being stationary relative to one another, the rotary components of those sections do not suffer any appreciable amount of wear during normal operation of the apparatus.

Assume now that it is desired to bring the arrow A on roller 12 in FIG. 1 into registration with the arrow C on sprocket 42. This involves advancing the sprocket relative to the roller. Assume further that it is desired to make that correction at the faster rate of speed, at least until the point of registration is at hand. To accomplish this, the operator first presses the SPEED CONTROL button 56. This energizes the solenoid 356 (FIG. 7) which switches cam 216 from its normal position illustrated in FIG. 2 to the position illustrated in FIG. 8 wherein its lobe 232 is in the raised position.

As soon as the rotating disk 138 rotates the shift key 196 around to its lowermost position shown in FIG. 8, the key will engage the cam lobe 232 and be switched to the position shown in FIG. 8 wherein it meshes with the bevel gear 188 on sleeve 176. As long as the fast speed correction mode is desired, the speed control button 56 must be maintained in its depressed position. Otherwise it will automatically return to its raised position and cause the cam 216 to return the shift key 198 to its original position illustrated in FIG. 2 during the next revolution of the disk 138.

Since the arrow A leads arrow C, the operator next depresses the RETARD button 54. As described previously, that energizes solenoid 352 which shifts the dog 294 to a position similar to the one shown in FIG. 6 with the result that the clutch plate 282 is brought to a stop. As described above, this causes the opposite clutch plate 252 to rotate relative to shaft 74 at a speed of $+V$ where V is the speed of shaft 74. Accordingly with the shift key 196 in that position, that rotation is coupled directly through planetary section 26, which imparts no speed reduction to the wave generator 86 which therefore rotates at a speed $+V$ relative to the shaft 74. This rotation of the wave generator causes the input shaft 34 and its sprocket 42 to be advanced in phase relative to the shafts 32, 74 and 14 at the reduced speed ratio characteristic of the particular strain wave drive 24, i.e. 80:1 in this example. That is equivalent to about 900° per minute when shaft 74 is running at 200 rpm.

If the operator greatly overshoots the point of registration, while maintaining button 56 depressed, he can release the RETARD button 54 disengaging its clutch assembly and depress the ADVANCE button 53. That will actuate solenoid 354 and move dog 238 to its engaged position illustrated in FIG. 6 thereby stopping the clutch plate 252 so that its speed relative the shaft 74 is $-V$. That relative motion is coupled directly through planetary section 66 to wave generator 86 in exactly the same way as described above and will cause the input shaft 34 and sprocket 42 to be retarded in phase relative to roller 12 at 1/80th of the shaft speed V.

Assume now that the operator wishes to bring the roller arrow A into registration with the sprocket arrow C before any overshoot at the slower rate to achieve precise registration. He releases the speed control button 56 causing solenoid 356 to return cam 216 to its normal position illustrated in FIGS. 2 and 7. In that position, its lobe 234 engages the shift key 196 upon the next revolution of the disk 138 thereby switching the key to its position shown in those figures so that it meshes with the teeth 104 and collar 102. The operator now depresses the RETARD button 54 thereby stopping the clutch plate 282 as described above. This causes the clutch plate 252 to rotate relative to the shaft 74 at a speed of $+V$. However, with the shift key 196 in that position, as described above the planetary section 26 effects a 20:1 speed reduction so that the strain wave generator 86 is rotated relative to shaft 74 at a speed of 1/20 V. When multiplied by the 80:1 speed reduction characteristic of the drive section 24, this causes the input shaft 34 and the sprocket 42 to be advanced in phase relative to roller 12 at a speed of 1/1600 V. Consequently, the sprocket arrow A will be moved extremely slowly into registration with the sprocket arrow C so that the precise point of registration can be achieved without any overshoot. At that point, the operator releases the button 54.

In the same fashion, the apparatus can be controlled to advance the roller relative to the sprocket at the slower rate by depressing button 53 with button 56 in its raised position. The operation of the apparatus during that mode is exactly as described above except that clutch plate 252 is stopped causing the strain wave generator 86 to rotate in the opposite direction at 1/20 V thereby causing the shaft 34 and sprocket 42 to rotate in the opposite direction from the roller at a relative speed of 1/1600 V.

It is important to note that the rotary clutch plates 252 and 282 have identical rotary moments of inertia. Therefore, their angular momentums are identical. When one plate is stopped to effect a phase correction, its angular momentum is transferred to the other plate which proceeds to rotate twice as fast so that the total angular momentum of the rotary system as a whole remains the same. Thus virtually no shock is transmitted to the machine frame when switching between the ADVANCE and RETARD modes of operation. Furthermore, the clutch section of the apparatus is fail safe in that even if the operator inadvertently depresses the ADVANCE and RETARD buttons at the same time, thereby locking both clutch plates 252 and 282, the bearings 274 simply skid in the clutch plate races.

Likewise, the switching of the apparatus between its two speed modes results in no appreciable amount of shock to the machine frame. This is because at the time of switching, the disk 138 and the bevel gears 102 and 188 are rotating at essentially the same speed.

It will be seen from the foregoing, then, that the apparatus 10 permits the phase and speed of a rotary shaft to be very closely controlled relative to the position of another rotary member. The apparatus is mounted directly on the shaft which it controls and effects its speed and phase corrections without requiring a secondary power source. Moreover, the apparatus is compact so that it can be retrofit on existing machinery without requiring relocation thereof. Additionally through its novel clutch and planetary mechanisms, the apparatus permits speed and phase corrections at a plurality of speeds. Further, because of the special hourglass shape of gear 62, the components of the apparatus suffer minimum stress and wear. Yet with all of these advantages, the apparatus as a whole and drive section 24 in particular are relatively inexpensive to make and assemble. Furthermore, for the reasons described above, they require a minimum amount of maintenance and repair.

It will thus be seen that the objects set forth above, among those made apparent from the preceding description are efficiently attained. Also, certain changes may be made in the above construction without departing from the scope of the invention. For example, instead of using manual button switches in the control section 30, the solenoids in the control section can be actuated from a remote location by suitable limit sensing means or other sensing devices to cause apparatus 10 to control the shaft 14 relative to a reference in response to various conditions such as web tension changes, the height of a liquid in a process tank, etc. Also if the high gear reduction provided by section 26 is not needed in a given application, the section 26 including collar 102 on the input shaft can be replaced by an annular adaptor one side of which corresponds to the notched end of tube 110 and the other side of which is provided with a lateral key like the projecting end of key 168 so that the adapter rotatively couples the wave generator to ring 252 in clutch section 28. Of course spacer rings would have to be provided between thrust bearing 309 and the Belleville washers 310 to axially load the wave generator. Therefore, it is intended that all matter contained in the above description or shown in the accompanying drawings shall be interpreted as illustrative and not in a limiting sense.

It is also to be understood that the following claims are intended to cover all of the specific features of the invention herein described.

What is claimed as new and desired to be secured by Letters Patent of the United States is:

1. Apparatus for controlling the phase or speed of a rotary shaft relative to another element comprising
   A. the strain wave drive including
   (1) a rigid ring gear,
   (2) a first shaft connected to the rigid gear,
   (3) a deformable ring gear,
   (4) a second shaft connected to the deformable gear,
   (5) a strain wave generator engaging the deformable gear, and
   (6) means for rotatively mounting the rigid gear and the deformable gear coaxially to one another so that said gears are in toothed engagement around at least parts of their peripheries;
   B. means for rotatively coupling the wave generator to the second one of said shafts so that said gears rotate in unison whereby said shafts are effectively rotatively keyed together, and
   C. means for dynamically rotating the wave generator through any selected angle in one direction or the other relative to said one shaft at a first rate so as to cause said one shaft to be advanced or retarded in phase relative to the other shaft at a second rate less than the first rate.

2. The apparatus defined in claim 1 wherein
   A. said first shaft is tubular,
   B. said rigid gear is formed on an inside surface of the first shaft,
   C. the deformable gear and second shaft are rotatively mounted coaxially inside the first shaft, and
   D. the wave generator is rotatively mounted on the second shaft and extends inside the deformable gear.

3. The apparatus defined in claim 2 and further including a sprocket secured to the first shaft coaxially therewith.

4. Apparatus for controlling the phase or speed of a rotary shaft relative to another element comprising
   A. a strain wave drive including
   (1) a rigid ring gear,
   (2) a first shaft connected to the rigid gear,
   (3) a second shaft,
   (4) a deformable ring gear connected to the second shaft and formed as an annular body of revolution, one end portion of the body in toothed engagement with the rigid gear being generally conical with a first selected diameter, the other end portion of the body connected to the second shaft being generally cylindrical and having a second selected diameter, and the portion of the body intermediate said two end portions having a third selected minimum diameter which is appreciably less than said first and second diameters;
   (5) a strain wave generator engaging the deformable gear, and
   (6) means for rotatively mounting the rigid gear and the deformable gear coaxially to one another so that said gears are in toothed engagement around at least part of their peripheries;
   B. means for rotatively coupling the wave generator to the second shaft so that said gears rotate in unison whereby said shafts are effectively rotatively keyed together, and
   C. means for selectively dynamically rotating the wave generator in one direction or the other relative to the second shaft at a first rate so as to cause said second shaft to be advanced or retarded in phase relative to said first shaft at a second rate less than the first rate.

5. The apparatus defined in claim 4 wherein said body of revolution has the general shape of an hour glass.

6. The apparatus defined in claim 4 wherein said second diameter is less than said first diameter.

7. The apparatus defined in claim 4 wherein
   A. the connection of said other end portion of the body to the second shaft is made at a first plane through the deformable gear where radial and axial gear motions are minimal, said first plane being spaced generally parallel to a second plane defined by said third selected diameter, and
   B. said gear has a smooth shape transition between said first and second planes.

8. The apparatus defined in claim 7 wherein the transition from the third diameter to the second diameter is outward along mirror image arcs defining more or less sections of a sphere.

9. Apparatus for controlling the phase or speed of a rotary shaft relative to another element comprising
   A. a strain wave drive including
   (1) a rigid ring gear,
   (2) a first shaft connected to the rigid gear,
   (3) a deformable ring gear,
   (4) a second shaft connected to the deformable gear,
   (5) a strain wave generator engaging the deformable gear, and
   (6) means for rotatively mounting the rigid gear and the deformable gear coaxially to one another so that said gears are in toothed engagement around at least parts of their peripheries;
   B. means for rotatively coupling the wave generator to one shaft so that said gears rotate in unison whereby said shafts are effectively rotatively keyed together, and
   C. means for selectively dynamically rotating the wave generator in one direction or the other relative to said one shaft at a first rate so as to cause the other shaft to be advanced or retarded in phase relative to said one shaft at a second rate less than the first rate, wherein said gears, first shaft, wave generator, mounting means, coupling means and rotating means are all mounted coaxially on and supported by the second shaft.

10. Apparatus for controlling the phase or speed of a rotary shaft relative to another element comprising
    A. a strain wave drive including
    (1) a rigid ring gear,
    (2) a first shaft connected to the rigid gear,
    (3) a deformable ring gear,
    (4) a second shaft connected to the deformable gear,
    (5) a strain wave generator engaging the deformable gear, and
    (6) means for rotatively mounting the rigid gear and the deformable gear coaxially to one another so that said gears are in toothed engagement around at least parts of their peripheries;

B. means for rotatively coupling the wave generator to one of said shafts so that said gears rotate in unison whereby said shafts are effectively rotatively keyed together, said coupling means comprising
   (1) bearing means rotatively fixed to said one shaft,
   (2) means rotatably mounted on said one shaft and coacting with the bearing means, said rotatably mounted means being rotatively coupled to the wave generator, and
   (3) torque transmitting means coacting with the bearing means and the rotatably mounted means, and
C. means for selectively dynamically rotating the wave generator in one direction or the other relative to said one shaft at a first rate so as to cause the other shaft to be advanced or retarded in phase relative to said one shaft at a second rate less than the first rate.

11. The apparatus defined in claim 10 wherein
A. the torque transmitting means comprises a lubricant coated on the bearing means and which has a relatively high coefficient of traction under pressure, and
B. means for exerting pressure on the lubricant.

12. The apparatus defined in claim 10 wherein the selective rotating means comprises means for changing the rotary speed of the rotatably mounted means relative to said one shaft.

13. The apparatus defined in claim 12 wherein the speed changing means comprises clutch means.

14. The apparatus defined in claim 10 wherein the selective rotating means includes means for speeding up the rotation of the rotatably mounting means relative to said one shaft.

15. The apparatus defined in claim 14 wherein the speed-up means comprises
A. second means rotatably mounted on said one shaft and coacting with the bearing means on the opposite side thereof from the first rotatably mounted means, and
B. means for changing the rotary speed of the second rotatably mounted means relative to said one shaft.

16. The apparatus defined in claim 15 wherein the changing means comprises clutch means.

17. The apparatus defined in claim 10 wherein the selective rotating means comprises means for changing the speed of the rotatably mounted means relative to said one shaft.

18. Apparatus for controlling the phase or speed of a rotary shaft relative to another element comprising
A. a strain wave drive including
   (1) a rigid ring gear,
   (2) a first shaft connected to the rigid gear,
   (3) a deformable ring gear,
   (4) a second shaft connected to the deformable gear,
   (5) a strain wave generator engaging the deformable gear, and
   (6) means for rotatively mounting the rigid gear and the deformable gear coaxially to one another so that said gears are in toothed engagement around at least parts of their peripheries;
B. means for rotatively coupling the wave generator to one of said shafts so that said gears rotate in unison whereby said shafts are effectively rotatively keyed together, said coupling means comprising speed changing planetary means acting between said one shaft and the wave generator so that the rotary speeds of said one shaft and wave generator have a selected ratio whereby said rate of advancement or retardation of the other shaft relative to said one shaft is a function of said speed ratio, and
C. means for selectively dynamically rotating the wave generator in one direction or the other relative to said one shaft at a first rate so as to cause the other shaft to be advanced or retarded in phase relative to said one shaft at a second rate less than the first rate.

19. The apparatus defined in claim 18 and further including means for selectively activating and deactivating the planetary means in said coupling means so that said advancement and retardation of the other shaft relative to the one shaft can occur at a plurality of different rates.

* * * * *